(12) United States Patent
Ryska et al.

(10) Patent No.: US 8,828,315 B2
(45) Date of Patent: *Sep. 9, 2014

(54) TABLE WITH ETHYLENE SCRUBBER

(71) Applicant: Hussmann Corporation, Bridgeton, MO (US)

(72) Inventors: Antonin Ryska, Prague (CZ); Marketa Kopecka, Vsetin (CZ); Lubos Forejt, Statenice (CZ); John M. Roche, Bishop, GA (US); Daniel Zmola, Lety (CZ); Michal Kolda, Prague (CZ)

(73) Assignee: Hussmann Corporation, Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,658

(22) Filed: Jul. 8, 2013

(65) Prior Publication Data

US 2013/0295247 A1 Nov. 7, 2013

Related U.S. Application Data

(63) Continuation of application No. 12/625,088, filed on Nov. 24, 2009, now abandoned, and a continuation of application No. 13/493,537, filed on Jun. 11, 2012.

(51) Int. Cl.
| | |
|---|---|
| *A61L 9/00* | (2006.01) |
| *B01J 7/00* | (2006.01) |
| *A23B 7/015* | (2006.01) |
| *A23B 7/152* | (2006.01) |
| *A23L 3/28* | (2006.01) |

(52) U.S. Cl.
CPC .............. *A23B 7/152* (2013.01); *A23B 7/015* (2013.01); *A23L 3/28* (2013.01)
USPC ................................. 422/4; 422/306

(58) Field of Classification Search
CPC ............ A23B 7/00; B01J 19/00; A61L 2/00; A61L 9/00
USPC ..................... 422/40, 5, 1, 4, 306
See application file for complete search history.

(56) References Cited

U.S. PATENT DOCUMENTS

| | | | | |
|---|---|---|---|---|
| 3,333,967 | A | * | 8/1967 | Burg ............................. 426/419 |
| 4,015,366 | A | * | 4/1977 | Hall, III ......................... 47/1.43 |
| 4,061,483 | A | * | 12/1977 | Burg ............................... 62/268 |
| 4,528,228 | A | | 7/1985 | Clevenger |
| 4,622,229 | A | | 11/1986 | Toshitsugu |
| RE33,067 | E | | 9/1989 | Corrigan |
| 4,961,322 | A | | 10/1990 | Oguma et al. |
| 5,502,979 | A | | 4/1996 | Renard |
| 5,616,354 | A | * | 4/1997 | Tompkins et al. ............ 426/324 |
| 5,661,979 | A | | 9/1997 | DeBoer |
| 5,771,790 | A | | 6/1998 | Barrows |

(Continued)

*Primary Examiner* — Regina M Yoo
(74) *Attorney, Agent, or Firm* — Michael Best & Friedrich LLP

(57) ABSTRACT

A display for supporting produce generating ethylene gas as the produce ripens includes a surface for supporting the produce, a blower positioned in communication with the produce to move a gas containing at least a portion of the ethylene gas from the produce and an ethylene scrubber positioned in communication with the produce and in a flow path of the gas. The ethylene scrubber removes the at least a portion of the ethylene from the gas. The display does not include a refrigeration system such that a life of the produce is lengthened without use of refrigeration.

8 Claims, 2 Drawing Sheets

(56) References Cited

U.S. PATENT DOCUMENTS

| | | | |
|---|---|---|---|
| 5,779,912 A | 7/1998 | Gonzalez-Martin et al. | |
| 6,054,153 A | 4/2000 | Carr et al. | |
| 6,113,671 A | 9/2000 | Garrett | |
| 6,797,300 B2 * | 9/2004 | Mendez | 426/321 |
| 7,296,422 B2 | 11/2007 | Strohm et al. | |
| 7,601,376 B2 * | 10/2009 | Stanley | 426/248 |
| 2004/0050482 A1 | 3/2004 | Abrams | |
| 2004/0131736 A1 | 7/2004 | Pan et al. | |
| 2005/0089458 A1 | 4/2005 | Oke | |
| 2007/0041882 A1 | 2/2007 | Roseberry et al. | |
| 2007/0104841 A1 | 5/2007 | Min et al. | |
| 2008/0159910 A1 | 7/2008 | Dick et al. | |
| 2009/0084264 A1 | 4/2009 | Carrabre et al. | |

\* cited by examiner

TABLE WITH ETHYLENE SCRUBBER

CROSS REFERENCE TO RELATED APPLICATIONS

The present application is a continuation of U.S. patent application Ser. No. 12/625,088, filed Nov. 24, 2009, and is a continuation of U.S. patent application Ser. No. 13/493,537, filed Jun. 11, 2012, which is a divisional of U.S. patent application Ser. No. 12/625,088, filed Nov. 24, 2009, the entire contents of both of which are herein incorporated by reference.

BACKGROUND

The present invention relates to display tables for produce, such as fruits and vegetables. Display tables typically include a table top for supporting produce.

SUMMARY

In one construction, the invention provides a display table for supporting produce. The display table includes an enclosure, a table top defining an upper surface of the enclosure, a blower, an ethylene scrubber and an outlet. The table top is open to the atmosphere and configured to support the produce, and includes perforations. The blower is positioned in communication with the enclosure to create an underpressure that draws a gas into the enclosure through the perforations. The ethylene scrubber is positioned in communication with the enclosure and in a flow path of the gas, the ethylene scrubber being configured to remove at least a portion of ethylene from at least a portion of the gas. The outlet is located downstream of the ethylene scrubber for returning the gas from the enclosure to the atmosphere.

In another construction, the invention provides a method of preserving produce. The method includes supporting the produce on a perforated table top open to the atmosphere, drawing a gas into an enclosure through perforations in the perforated table top, removing at least a portion of ethylene from at least a portion of the gas, and directing the gas from the enclosure to the atmosphere after at least a portion of the ethylene has been removed from at least a portion of the gas.

In yet another construction, the invention provides a display table for supporting produce. The display table includes an enclosure, a table top defining an upper surface of the enclosure, a blower, an ultraviolet lamp, a surface irradiated by the ultraviolet lamp, and an outlet. The table top is open to the atmosphere and configured to support the produce, and includes perforations. The blower is positioned in communication with the enclosure to create an underpressure that draws a gas into the enclosure through the perforations. The ultraviolet lamp is positioned in communication with the enclosure and in a flow path of the gas. The surface irradiated by the ultraviolet lamp has a photocatalyst suitable to provide photocatalytic oxidation of ethylene. The outlet is positioned downstream of the ethylene scrubber for returning the gas from the enclosure to the atmosphere. The ultraviolet lamp and photocatalyst remove at least a portion of ethylene from at least a portion of the gas. The table top includes at least two layers of perforations that are staggered with respect to each other and configured to prevent at least some light from the ultraviolet lamp from directly exiting through the table top.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
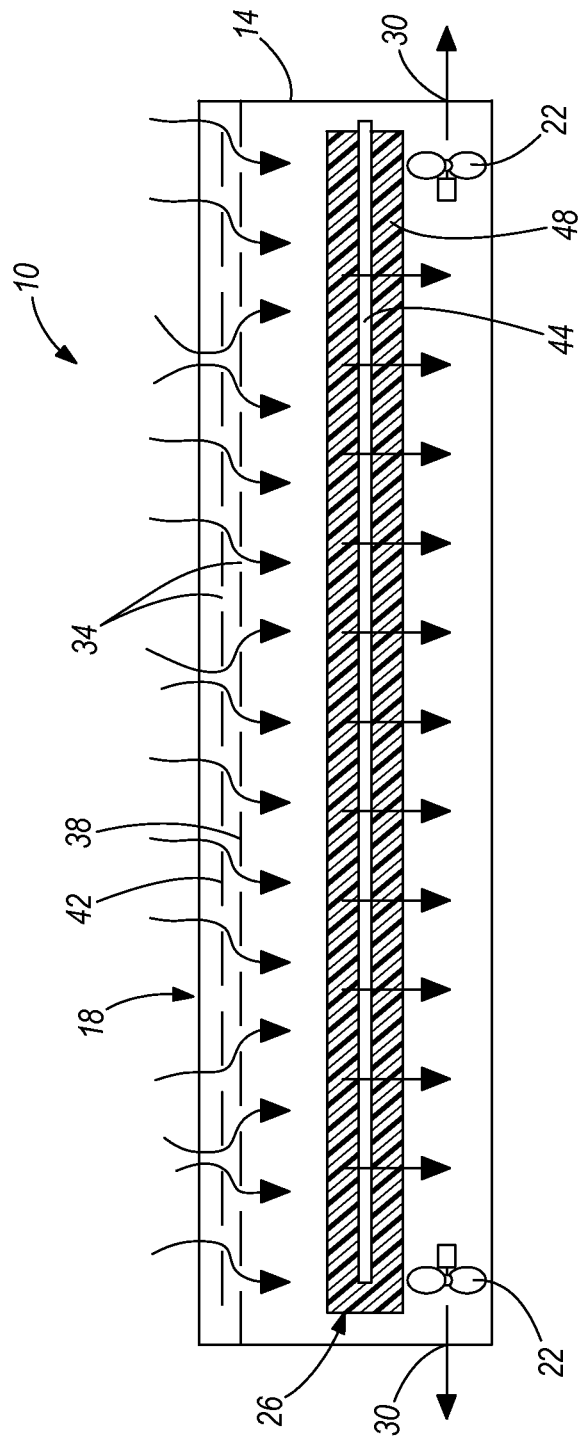
FIG. 1 is a schematic view of a display table for supporting produce according to the present invention.

FIG. 1 illustrates a display table 10 for produce, such as fruits and vegetables. The display table 10 includes an enclosure 14, a table top 18 defining an upper surface of the enclosure, a blower 22, an ethylene scrubber 26, and an outlet 30. The display table 10 is designed to remove ethylene gas from the vicinity of the produce supported on the display table to extend the life of the produce. Ethylene is a hormone produced by fruits and vegetables that accelerates ripening. Removal of ethylene slows the ripening process and extends the life of produce. As will be described in greater detail below, ethylene gas is drawn into the enclosure 14, removed by the ethylene scrubber 26, and clean air is expelled through the outlet 30.

The table top 18 is open to the atmosphere and configured to support the produce, and includes perforations 34. In the illustrated construction, the table top 18 includes first and second perforated sheets 38, 42 having staggered, or offset, perforations 34. The perforations 34 are provided to allow a flow of gas through the table top 18, as will be described in greater detail below. In other constructions, the table top 18 may have one, three or more perforated sheets that allow gas to flow through the table top 18.

In the illustrated construction, the ethylene scrubber 26 includes an ultraviolet lamp 44 and a surface 48 irradiated by the ultraviolet lamp having a photocatalyst. The ultraviolet lamp 44 is positioned in communication with the enclosure 14 and in a flow path of the gas. The ultraviolet lamp 44 and surface having a photocatalyst 48 cooperate in photocatalytic oxidation, a process that removes air pollutants, such as ethylene, on an ultraviolet irradiated surface having a suitable photocatalyst, such as titatnium dioxide ($TiO_2$). The ultraviolet lamp 44 and photocatalyst 48 remove at least a portion of ethylene from at least a portion of the gas. As described above, the table top 18 includes at least two layers of perforations 34 that are staggered with respect to each other. The two perforated sheets 38, 42 are arranged such that at least a portion of light from the ultraviolet lamp 44 that passes through the first perforated sheet 38 is blocked by a non-perforated portion of the second perforated sheet 42. Preferably, the first and second perforated sheets 38, 42 are arranged such that no light from the ultraviolet lamp 44 can directly escape through the table top 18.

In the illustrated construction, two blowers 22 are positioned within the enclosure 14 adjacent two outlets 30. The outlets 30 are positioned in the sides of the enclosure 14 downstream of the ethylene scrubber 26, and the blowers 22 are positioned for returning the gas from the enclosure 14 to the atmosphere. In other constructions, the outlets 30 may be positioned in another suitable location on the enclosure 14.

In operation, the display table 10 preserves and extends the life of produce. The table top 18 is open to the atmosphere and supports produce that produces ethylene gas. One or more of the blowers 22 work to create an underpressure to draw gas from the atmosphere into the enclosure 14 through the perforations 34 in the table top 18. The ethylene scrubber 26 removes at least a portion of ethylene from the gas, producing a clean gas, and the clean gas is expelled to the atmosphere through one or more of the outlets 30.

In other constructions, the ethylene scrubber 26 may include potassium permanganate ($KMnO_4$), an effective oxidizer of ethylene. Major intermediates of the oxidation of ethylene are ethylene oxide ($C_2H_4O$), acetaldehyde ($CH_3CHO$), vinyl acetate ($C_4H_6O_2$), and ethylene glycol ($C_2H_4(OH)_2$).

In yet other constructions, the ethylene scrubber 26 may include a reactive oxygen species (ROS) generator. The ROS generator produces one or more of oxygen ions, free radicals, organic and inorganic peroxides, ozone, and other reactive oxygen species. These reactive oxygen species oxidize air pollutants, such as ethylene, to effectively remove them from the air. In one construction, the ROS generator is positioned within the enclosure 14, similar to the other ethylene scrubbers 26 described above, to remove ethylene after it is drawn in through the perforations 34.

Figure 2:
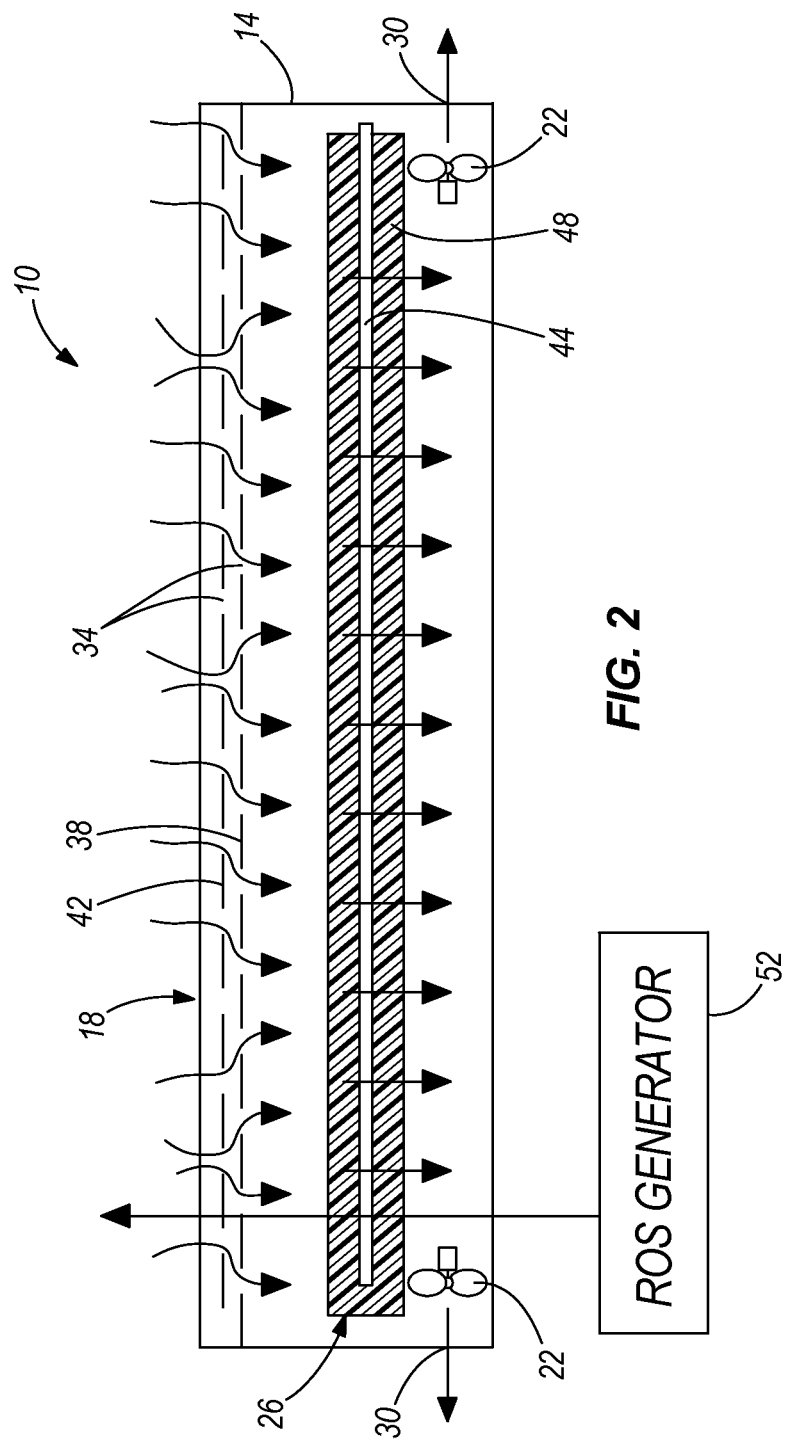
FIG. 2 is a schematic view of another construction of the display table of FIG. 1.

FIG. 2 illustrates another construction of the display table 10 having an ROS generator 52 positioned outside of the enclosure 14 and directing reactive oxygen species to the vicinity of the produce supported by the table top 18. In the illustrated construction of FIG. 2, the ROS generator 52 is provided in addition to the ethylene scrubber 26, which is positioned within the enclosure 14 as described above. The ROS generator 52 supplements the ethylene scrubber 26 by providing reactive oxygen species to neutralize ethylene above the table top 18.

In other constructions, the ROS generator 52 is positioned in fluid communication with the interior of the enclosure 14, or within the enclosure 14. The blower 22 is positioned in communication with the enclosure 14 to draw a gas from the atmosphere into the enclosure 14 through the bottom or sides of the enclosure 14, e.g., through the outlets 30. The blower 22 directs ROS and clean air out through the perforations 34 in the table top 18 to the vicinity of the produce to neutralize ethylene.

In yet other constructions, the ethylene scrubber may include any combination of one or more of a ROS generator, an ultraviolet lamp with photocatalyst, potassium permanganate, and other ethylene scrubbers.

Thus, the invention provides, among other things, a display table with ethylene scrubber for preserving the life of produce. Various features and advantages of the invention are set forth in the following claims.

What is claimed is:

1. A method of preserving produce, comprising:
supporting the produce on a surface;
drawing a gas across the produce;
removing at least a portion of ethylene from at least a portion of the gas; and
lengthening a life of the produce without use of refrigeration.

2. The method of claim 1, wherein the step of removing at least a portion of ethylene includes positioning a reactive oxygen species generator in communication with the produce and in a flow path of the gas.

3. The method of claim 1, wherein the step of removing at least a portion of ethylene includes:
positioning an ultraviolet lamp in communication with the produce and in a flow path of the gas, and
irradiating a second surface covered by a suitable photocatalyst and positioned in the flow path of the gas.

4. The method of claim 1, wherein the step of removing at least a portion of ethylene includes oxidizing at least a portion of ethylene using potassium permanganate.

5. The method of claim 1, wherein the step of drawing a gas across the produce includes positioning a blower in communication with the produce.

6. The method of claim 5, wherein the step of positioning a blower includes positioning the blower below the surface and drawing the gas through perforations in the surface.

7. The method of claim 6, wherein the step of drawing the gas through perforations in the surface includes drawing the gas through a first set of the perforations in the surface and then drawing the gas through a second set of the perforations in the surface.

8. The method of claim 6, wherein the step of drawing the gas through perforations in the surface includes drawing the gas through a first set of the perforations in the surface and then drawing the gas through a second set of the perforations offset from the first set of the perforations in the surface.

* * * * *